3,637,759
CHROMANES
Jaroslav Weichet, Ludvik Blaha, Jarmila Hodorova, Antonin Dlabac, and Vaclav Trcka, Prague, Czechoslovakia, assignors to Spofa United Pharmaceutical Works, Prague, Czechoslovakia
No Drawing. Filed July 30, 1969, Ser. No. 846,235
Claims priority, application Czechoslovakia, Aug. 1, 1968, 5,609/68
Int. Cl. C07d 7/20
U.S. Cl. 260—345.5     7 Claims

ABSTRACT OF THE DISCLOSURE

Novel chromane derivatives characterized by cardiovascular actvity having the following formula:

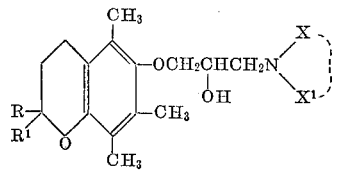

wherein R represents hydrogen or straight or branched chain alkyl having from 1 to 16 carbon atoms, $R^1$ represents hydrogen or methyl, $X^1$ represents hydrogen, alkyl having 1 to 8 carbon atoms or aralkyl having up to 8 carbon atoms, X represents hydrogen, alkyl having 1 to 12 carbon atoms, aryl having up to 12 carbon atoms, aralkyl having up to 12 carbon atoms or cycloalkyl having up to 12 carbon atoms, wherein $X^1$ and X, possibly together with a —C—C—C—, —C—O—C— or

—C—N—C— linkage can, taken together with the nitrogen atom to which they are attached form a heterocyclic ring, and the pharmaceutically acceptable acid addition salts.

---

This invention relates to novel chromane derivatives and to processes of making and using the same.

The novel chromane derivatives in accordance with the invention correspond to the following formula:

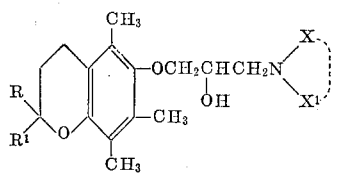

wherein R represents hydrogen or straight or branched chain alkyl having from 1 to 16 carbon atoms, $R^1$ represents hydrogen or methyl, $X^1$ represents hydrogen, alkyl having 1 to 8 carbon atoms, or aralkyl having up to 8 carbon atoms, X represents hydrogen, alkyl having 1 to 12 carbon atoms, aryl having up to 12 carbon atoms, aralkyl having up to 12 carbon atoms or cycloalkyl having up to 12 carbon atoms, wherein $X^1$ and X, possibly together with a —C—C—C, —C—O—C—, or

C—N—C— linkage can, taken together with the nitrogen atom to which they are attached, form a heterocyclic ring. Included within the scope of the invention are the pharmaceutically acceptable acid addition salts of compound I.

The novel chromane derivatives of the invention are characterized by valuable pharmacodynamic activities. They are effective to increase the flow of blood through the coronary system without exerting any unfavorable influence on myocardial function, i.e., they do not demonstrate any negative inotropic activity. They also exert an effect on the activity of the adrenergic system in the alpha-lytic sense. They have proved particularly suitable for use in the treatment of cardiac disturbances, as for instance in myocardial infarct, angina pectoris and in the prevention of coronary spasms.

The compound I of the invention can be prepared by reacting a compound having the following formula

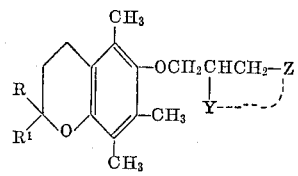

wherein R and $R^1$ are as above defined, Y is hydroxy and Z is chlorine or bromine, wherein X and Y may be linked by an oxygen bridge —O—, with an amino compound having the formula

wherein $X^1$ and X are as above defined or designate a phthalic acid or succinic acid group, after which the resulting chromane derivative, possibly after hydrolysis or hydrogenolysis and/or a reductive alkylation, can through neutralization with an inorganic or organic acid be converted into the corresponding acid addition salt.

The reaction of the compound II is carried out most advantageously with an equimolar amount or an excess amount of the amino compound III, wherein $X^1$ and X have the same meaning as in compound I, in water or in a water containing or water free alkanol containing 1 to 3 carbon atoms, at a temperature of from 0 to 100° C. and preferably at from 20 to 80° C.

The reaction wherein in compound II, the Y and Z moieties are linked via an oxygen bridge —O— and in the amino compound III, $X^1$ and X represents phthalic acid or succinic acid groups is advantageously carried out in a water free alcohol having 1 to 3 carbon atoms, at the boiling point of the reaction mixture, in the presence of an organic tertiary base, for instance, pyridine, as catalyst. Thereafter the phthalic acid or succinic acid group is hydrolytically split off from the resulting reaction product.

In the case, wherein in the compound I which is formed, $X^1$ designates benzyl and X alkyl containing 1 to 5 carbon atoms, this compound preferably in the form of the free base, is subjected to a catalytic debenzylation by treatment thereof with hydrogen in the presence of a palladium catalyst.

If, in accordance with the process of the invention, there is obtained a compound I, wherein $X^1$ and X are both hydrogen, then the compound is subjected to a reductive alkylation in the presence of at least an equivalent of acetone, in a water-containing alcohol having 1 to 3 carbon atoms, and under the influence of a complex metal hydride, for example sodium borohydride or under the influence of hydrogen, in the presence of a platinum or palladium catalyst.

As suitable amino compounds of Formula III there may be mentioned, for example, ammonia, methylamine, ethylamine, isopropylamine, butylamine, cyclohexylamine, benzyl-tert.-butylamine, piperidine, morpholine, piperazine and the like, if necessary phthalimide or succinimide can be used.

The starting materials of Formula II, that is the corresponding halohydrines or epoxides are also novel. They can be prepared by conventional methods, for example by the condensation of the corresponding hydroxychromane derivative with epichlorohydrin, in the presence of a basically reacting agent, such as piperidine. The halogen derivatives can be converted into the epoxy derivatives and vice versa. Thus the epoxy derivatives can be obtained from the halogen derivatives by treatment of the latter with alkali-metal hydroxides; the halohydrines, for instance chloro- or bromohydrin can be obtained from the epoxide derivatives by treatment of the latter with hydrohalic acid. They can also be prepared by other known methods for example by the conversion of the corresponding allyloxy derivatives.

Suitable acids for preparing the acid addition salts, include as inorganic acids, hydrohalic acids, sulfuric, phosphoric, perchloric acid and the like, and as organic acid, acetic, phenylacetic, tartaric acid and its derivatives, fumaric, oxalic, mandelic, camphorsulfonic acid and the like. The salts are generally very soluble in water and similarly to the free bases suitable for use in the preparation of medicaments.

The following examples are given for the purpose of illustrating the invention, but are in no wise to be construed as a limitation of the scope thereof.

EXAMPLE 1

A mixture of 10.3 g. 2,5,7,8-tetramethyl-6-hydroxychromane and 12.9 g. epichlorohydrin together with 0.11 ml. piperidine, was heated for 6 hours at 100° C. Thereafter the excess epichlorohydrin was distilled off from the reaction mixture under a vacuum of about 10 torr and a bath temperature of 100° C. bath temperature. The residue was dissolved in 50 ml. water-free benzene and under-stirring, at a temperature of 10–15° C., there were added 3 portions of 6.4 g. pulverized sodium hydroxide at 30 minute intervals. The reaction mixture was then stirred for a further 2.5 hours at room temperature. 80 ml. ice water were then poured into the reaction mixture, the benzene layer diluted with 100 ml. ether, separated off and washed with water until neutral. Following drying over water-free magnesium sulfate, the solvent was distilled off under reduced pressure. The residue was distilled under vacuum and a fraction boiling at 129–134° C./0.05 torr collected. The yield of 2,5,7,8-tetramethyl-6-/2,3-epoxypropoxy/chromane amounted to 7.05 g. The compound was recovered at first in the form of an oil, which solidified to form crystals on standing. Following recrystallization from methanol, the compound melted at 80–81° C.

A solution of 5.7 g. 2,5,7,8-tetramethyl-6-/2,3-epoxypropoxy/chromane and 4.5 g. isopropylamine in 25 ml. ethanol was heated for 3.5 hours at 70° C. Thereafter the volatile components were distilled off from the reaction mixture under decreased pressure. The crystalline residue thereby obtained was taken up in 25 ml. petroleum ether, the resultant suspension heated to boiling and following cooling, the crystalline portion separated off with suction and washed with petroleum ether. There were recovered substantially pure 2,5,7,8-tetramethyl-6-/3-isopropylamino-2-hydroxypropoxy/chromane having a melting point of 113–119° C. The yield amounted to 4.6 g. The thusly prepared base was dissolved in 600 ml. water-free ether and into this solution under cooling, water-free hydrogen chloride gas introduced. Following cooling to about 5° C., the separated crystals were suctioned off, washed with ether and dried. There was recovered 4.5 g. 2,5,7,8 - tetramethyl-6-/3-isopropylamino - 2 - hydroxypropoxy/chromane-hydrochloride having a melting point of 174–176° C. The compound could be further purified by recrystallization from a mixture of methanol and ethylacetate.

EXAMPLE 2

Analogously to Example 1, there were obtained from 9.6 g. 5,7,8 - trimethyl - 6 - hydroxychromane, 5,7,8 - trimethyl-6-(2,3-epoxypropoxy) chromane in a yield of 7 g. This compound boiled at 116–120° C./0.05 Torr and melted at 65° C. (methanol).

A solution of 5.8 g. 5,7,8-trimethyl-6-(2,3-epoxypropoxy) chromane and 4.7 g. isopropylamine in 25 ml. ethanol was heated in a sealed vessel for 3.5 hours at 75° C. Thereafter the reaction mixture was subjected to distillation at reduced pressure and the volatile components separated off. The recovered crystalline residue was taken up in 25 ml. petroleum ether and resultant suspension heated to boiling. Following cooling, the crystalline material was suctioned off, washed with petroleum ether and dried. There were recovered in the form of the base 5,7,8-trimethyl - 6 - (3-isopropylamino - 2 - hydroxypropoxy)-chromane melting at 103–109° C. in a yield of 5.6 g. The corresponding hydrochloride was prepared by dissolving the base in 500 ml. water-free ether and introducing into this solution under cooling, water-free hydrogen chloride gas. After cooling down to 0° to 5° C. the crystalline hydrochloride was separated off with suction, washed with acetone and air dried. There were recovered 6 g. 5,7,8 - trimethyl - 6 - (3 - isopropylamino - 2 - hydroxypropoxy)-chromane-hydrochloride melting at 176–180° C. This compound could be purified by recrystallization from a mixture of methanol and ethylacetate. The pure compound melted at 187° C.

EXAMPLE 3

A solution of 4 g. 2,5,7,8-tetramethyl-6-(2,3-epoxypropoxy)-chromane melting at 80–81° C. prepared according to Example 1, in 100 ml. benzene was stirred at room temperature with 150 ml. 35% hydrobromic acid for 45 minutes. Following separation of the watery phase, the benzene layer was washed with saturated sodium chloride solution until neutral and dried over water free sodium sulfate. After the benzene had been distilled off in vacuum at about 10 torr and a bath temperature of 90° C., there were recovered substantially pure 2,5,7,8-tetramethyl-(3-bromo-2-hydroxypropoxy)-chromane in the form of a viscous, yellowish oil, which crystallizes out on standing. The yield amounted to 5 g.

A solution of 5 g. of the bromohydrin thusly obtained and 2.5 g. isopropylamine in 5 ml. ethanol were heated at 60° C. for 8 hours in a sealed vessel. Following cooling, the reaction mixture was diluted with 70 ml. water and 30 ml. of a 1 N NaOH solution. The product which separated out was extracted with 2–50 ml. portions of ether and the thusly purified ether extract washed with a saturated NaCl solution. Following drying over water-free sodium sulfate, the ether was distilled off. The residue was purified by the procedure set out in Example 1. There were recovered 2,5,7,8 - tetramethyl-6-(3-isopropylamino-2-hydroxypropoxy)-chromane melting at 112–117° C. in a yield of 2.4 g.

EXAMPLE 4

A mixture of 2,5,7,8 - tetramethyl - 2 - (4,8-dimethylnonyl) - 6 - hydroxychromane and 18 g. epichlorohydrin, with an addition of 0.1 ml. piperidine were heated for 6.5 hours at 90–100° C. Thereafter the excess epichlorohydrin was distilled off in vacuo, and the residue worked up analogously to Example 1. There were recovered 14.1 g. 2,5,7,8 - tetramethyl-2-(4,8-dimethylnonyl)-6-(2,3-epoxypropoxy)-chromane in the form of a viscous, yellowish oil having a boiling point of 155–160° C./0.01 torr.

The recovered epoxy derivative was dissolved in 45 ml. ethanol and after the addition of 6 g. isopropylamine, the mixture was heated in a sealed vessel for 3 hours at 60° C. The excess isopropylamine and ethanol were distilled off to completion in a water jet vacuum pump. The residue was dissolved in 200 ml. petroleum ether and this solution extracted with 80% aqueous methanol, to which concentrated hydrochloric acid had been added (4 ml. acid to 100 ml. methanol). The purified aqueous methanolic extract was shaken together with petroleum ether. Thereafter the mixture was made alkaline with 20%

NaOH solution and the free base taken up in petroleum ether. The petroleum ether solution of the base was washed with 50% methanol and saturated NaCl solution and dried over anhydrous sodium sulfate. After evaporation of the petroleum ether, in the vacuum of a water jet vacuum pump and at a bath temperature of 90° C., there were recovered substantially pure 2,5,7,8-tetramethyl-2-(4,8 - dimethylnonyl) - 6 - (3-isopropylamino - 2 - hydroxypropoxy)-chromane in the form of a yellow colored viscous oil. The yield amounted to 6.8 g.

EXAMPLE 5

A mixture of 34.4 g. 2,2,5,7,8 - pentamethyl-6-hydroxychromane (melting point 96–97° C.), 40.4 g. epichlorohydrin and 0.34 ml. piperidine were heated for 6 hours at 100° C. Thereafter the excess epichlorohydrin was distilled off in the vacuum of a water jet pump, at a bath temperature of 100° C. The residue was dissolved in 150 ml. water free benzene and under stirring at 10–15° C., there were introduced into the reaction mixture at half hour intervals 3 portions of 21 g. pulverized sodium hydroxide and the mixture stirred for a further 2.5 hours. 250 ml. ice water were poured into the reaction and the benzene layer separated off. The watery layer was extracted 3 times with ether. The purified ether and benzene extracts were washed with saturated NaCl solution until neutral and dried over anhydrous magnesium sulfate. The solvents were distilled off under reduced pressure and the residue distilled in vacuum. As 2,2,5,7,8-pentamethyl-6-(2,3-epoxypropoxy)-chromane there was recovered the fraction boiling at 126–127° C./0.07 torr. This product was recovered in the form of a yellowish colored viscous oil. The yield came to 24.4 g.

A solution of 5.1 g. of the thusly recovered epoxy derivative and 8.2 g. α,α-dimethylphenethylamine in 20 ml. ethanol were heated for 3.5 hours at 70° C. Thereafter the ethanol was distilled off from the reaction mixture and then in the vacuum of a water jet vacuum pump the excess α,α-dimethylphenethylamine was distilled off at a bath temperature of 150–160° C. The residue, which crystallized on cooling was dissolved in 50 ml. anhydrous ether and the ether solution acidified with hydrogen chloride gas. Following cooling, the crystalline 2,2,5,7,8-pentamethyl-6-[3-(α,α-dimethylphenethylamino) - 2 - hydroxypropoxy]-chromane-hydrochloride was suctioned off and dried. There were recovered 6.3 g. of the desired compound melting at 164–188° C. which was purified through crystallization out of a methanol-ethylacetate mixture (1:12). The melting point of the pure compound was 197–199° C.

EXAMPLE 6

A mixture of 73.5 g. 2,2,5,7,8-pentamethyl - 6 - (2,3-epoxypropoxy)-chromane, prepared according to Example 5, +53, 5 g. isopropylamine in 260 ml. ethanol were heated in a sealed vessel for 3.5 hours at 70° C. Thereafter the ethanol and excess isopropylamine were distilled off under reduced pressure and the crystalline residue taken up in 400 ml. petroleum ether. The recovered suspension was heated to boiling, following cooling the solid material was suctioned off, washed in petroleum ether and dried. There were recovered 61.5 g. 2,2,5,7,8-pentamethyl-6-(3-isopropylamino - 2 - hydroxypropoxy)-chromane in the form of its base melting at 116–118° C.

Following mixing of equivalent amounts of base and oxalic acid in ethanol, there was obtained a poorly water soluble neutral oxalate having a melting point of 232–234° C.

Through neutralization of a solution of the base in ethylacetate with hydrogen chloride gas there was obtained the water soluble hydrochloride having a melting point of 159–161° C. By mixing equivalent amounts of base and tartaric acid in ethanol, the water-soluble neutral tartrate having a melting point of 192–194° C. was formed.

EXAMPLE 7

A solution of 8.3 g. 2,2,5,7,8-pentamethyl-6-(2,3-epoxypropoxy)-chromane and 2.68 g. morpholine in 30 ml. ethanol were heated for 4 hours at 50° C. The excess ethanol was then distilled off and the unreacted morpholine distilled off in the vacuum of a water jet vacuum pump, at the end at a bath temperature of 100° C. The residue was dissolved in 50 ml. acetone, and the solution neutralized with hydrogen chloride gas. Following cooling to 0 to 5° C., the product which crystallized out was separated by suction and washed with ether. There were recovered 8.4 g. 2,2,5,7,8-pentamethyl - 6 - (3 - N-morpholino - 2 - hydroxypropoxy)-chromane-hydrochloride melting at 210–232° C. Following recrystallization out of ethanol it had a melting point of 232–246° C. with decomposition).

EXAMPLE 8

A solution of 8.1 g. 2,2,5,7,8-pentamethyl-6-(2,3-epoxypropoxy)-chromane and 6.6 g. tert.-butylamine in 30 ml. ethanol were allowed to stand over night at room temperature. Thereafter the ethanol and the excess tert.-butylamine were distilled off from the reaction mixture in the vacuum of a water jet vacuum pump, towards the end at a bath temperature of 100° C. The residue comprised the 2,2,5,7,8-pentamethyl-6-(3-tert.-butylamino-2-hydroxypropoxy)-chromane. The yield amounted to 10.6 g. The crude product was dissolved in 50 ml. ethanol and following warming this solution was treated with an ethanolic solution of 1.8 g. oxalic acid. After cooling the crystallized oxalate was suctioned off and washed with ethanol. There was recovered in a yield of 7 g. the neutral salt melting at 246–248° C.

The recovered oxalate was converted into the base by suspending the oxalate in a 1 N sodium hydroxide solution and the thusly freed base extracted with ether. The ether solution was evaporated to following washing and drying thereof over anhydrous sodium sulfate. There was thusly obtained the crude base having a melting point of 119°–121° C. which following recrystallization from heptane melted at 121–123° C.

EXAMPLE 9

A solution of 7.6 g. 2,2,5,7,8-pentamethyl-6-(2,3-epoxypropoxy)-chromane and 4.13 g. benzyl-isopropylamine in 20 ml. ethanol was heated for 3.5 hours at 75° C. Thereafter, under reduced pressure, the ethanol was evaporated off, the residue (11.9 g.) was dissolved in 20 ml. ether and neutralized with an etheric hydrogen chloride solution. Following cooling, the precipitated hydrochloride of not reacted benzylisopropylamine was separated off using suction. The filtrate was extracted with 150 ml. water and after separation the aqueous layer was made alkaline with ammonia. The liberated base i.e., 2,2,5,7,8-pentamethyl-6-[3-(N-benzyl - N - isopropylamino)-2-hydroxypropoxy]-chromane, was extracted wtih ether, the combined extracts washed with water dried over anhydrous magnesium sulfate and the ether evaporated off in vacuum. There were recovered 5.4 g. of the base in the form of a viscous oil. The corresponding perchlorate of this base was prepared by neutralization with 70% perchloric acid in ethanol. The salt melted at 164–167° C.

EXAMPLE 10

1.6 g. of a 20% palladium/carbon catalyst were introduced into a solution of 8.1 g. of the base 2,2,5,7,8-pentamethyl-6-[3-(N-benzyl-N-isopropylamino) - 2 - hydroxypropoxy]-chromane prepared according to Example 9 in 20 ml. methanol and the base hydrogenated at about 180 Torr hydrogen pressure and at room temperature until the hydrogen take up had ceased. The catalyst was separated off in the suction, washed with methanol, the filtrate evaporated to dryness under reduced pressure and the residue diluted with 30 ml. cyclohexane. Following cooling, the crystallized 2,2,5,7,8-pentamethyl-6-(3-isopropylamino-2-hydroxypropoxy)-chromane was separated off using suction. The yield amounted to 4.7 g. The melting point was 116–118° C., the compound being identical to that of Example 6.

EXAMPLE 11

4.9 g. benzyl-tert.-butylamine were added to a solution of 8.3 g. 2,2,5,7,8 - pentamethyl-6-(2,3-epoxypropoxy)-chromane in 40 ml. ethanol and the mixture heated for 3 hours at 70° C. The ethanol was then distilled off from the reaction mixture under reduced pressure at a temperature corresponding to boiling of the water bath, and the residue dissolved in 50 ml. anhydrous ether. This solution was neutralized with etheric hydrogen chloride solution. Following cooling the crystallized product was separated off with suction and recrystallized from ethanol. There were thusly recovered 5 g. 2,2,5,7,8-pentamethyl-6-[3-(N-benzyl-N-tert.-butylamino) - 2 - hydroxypropoxy]-chromane-hydrochloride having a melting point of 214–215° C.

EXAMPLE 12

A mixture of 11 g. crude 2,2,5,7,8-pentamethyl-6-(2,3-epoxypropoxy)-chromane, 5.8 g. phthalimide and 4 drops of pyridine in 70 ml. ethanol was heated to boiling under reflux for 6 hours. Following cooling to 0° C., there was separated from the reaction mixture using suction the unreacted phthalimide and the filtrate evaporated to dryness under reduced pressure. The oily residue was dissolved in 45 ml. ethanol, the solution treated with 8.4 g. of 50% hydrazine hydrate and the reaction mixture heated as boiling for 30 minutes. There were then introduced into the still warm mixture 120 ml. saturated ethanolic hydrogen chloride solution and this mixture heated to boiling for a further 45 minutes. After cooling, the precipitated phthalylhydrazide was separated off with suction and washed with ethanol. The combined filtrates were evaporated under reduced pressure to dryness, the residue diluted with 250 ml. water and 200 ml. ether and following dissolution, the ether layer was separated off. The water layer was extracted once again with ether and then made alkaline with 10% NaOH solution. The liberated base was extracted with ether, the ether washed with water and dried over anhydrous sodium sulfate. Following distillation of the ether in vacuo, there were recovered 2,2,5,7,8-pentamethyl-6-(3-amino - 2 - hydroxypropoxy)-chromane.

To a solution of 2.9 g. of the above base in 20 ml. methanol, there were added 3 ml. acetone and after about 15 minutes under stirring and cooling to a temperature of at the most 20° C. 0.9 g. sodium borohydride was added in divided portions. The reaction mixture was stirred without cooling for a further 2 hours whereby the temperature on its own rose to about 30° C. Methanol was distilled off from the reaction mixture under reduced pressure and the residue admixed with 100 ml. water and 100 ml. ether. Following dissolution of the residue, the ether layer was separated off, washed with water and dried over sodium sulfate. After distilling off the ether, toward the end under vacuum, the residue was dissolved in 30 ml. petroleum ether and allowed to crystallize at 0° C. The crystalline product was separated off with suction, washed with petroleum ether and dried. There was recovered 1 g. 2,2,5,7,8-pentamethyl-6-(3-isopropylamino-2-hydroxypropoxy)-chromane having a melting point of 115–118° C. The product was identical with that of Example 6.

Pharmacological properties of 2,2,5,7,8-pentamethyl-6-(3-isopropylamino - 2 - hydroxy - propoxy) - chromane (designated Cromipranol)

ACUTE TOXICITY (LD$_{50}$)

| Animal | Form of administration | |
|---|---|---|
| | Intravenous, mg./kg. | Per os, mg./kg. |
| Mouse | 64 | 670 |
| Rat | | 5,500 |

For parenteral administration, Cromipranol in the form of the tartrate in aqueous solution was used. There is a very large order of difference in the values for oral toxicity in the mouse and the rat, in the latter the compound is only very slightly toxic.

Blood vessel dilation in the isolated guinea pig heart

The blood vessel dilating activity of Cromipranol was determined in guinea pigs prepared according to Langendorff (isolated guinea pig heart) which at 37° C. had been perfused with Locke solution and saturated with oxygen. Cromipranol was infused in different concentrations for 4 minute periods. The flow through the prepared heart was determined and the changes in relative values determined. Each reported value represents the average of 5 separate preparations.

| Dose in μg./1 ml.: | Increase in flow in percent |
|---|---|
| 10.0 | 30 |
| 5.0 | 27 |
| 1.0 | 11 |
| 0.5 | 2.5 |

It is apparent from the data that Cromipranol increases the coronary flow in the isolated guinea pig heart.

Influence on experimental myocardial infarct

Rabbits were prepared for these experiments by surgical treatment of a branch of the left coronary artery so that an ischemia occurs followed by a myocardial infarct. Cromipranol was administered to the experimental animals in a daily dose of 20 mg./kg. per os on the day before the operation, the day of the operation and for the two days following the operation. The animals were followed by means of electrocardiograph, serum determinations of glutamo-oxalacetic acid and glutamo-pyruvicacidtransaminane (SGOT, SGPT) and lacticodehydrogenase (LDH). While for the control group on the day of the surgery 60% had not survived and by the third day following surgery 100% of the animals had died, in the case where Cromipranol had been administered on the third day following surgery 75% of the animals were still alive (only 25% had died). The other procedures clearly demonstrated the favorable effect of the Cromipranol, in reversing the pathological changes in the EKG picture, in improving the post-operative state and in lowering the increased SGOT-, SGPT- and LDH values.

The survival of the electrical myocardial activity on asphyxia

In a modified method according to Strubelt, urethane anesthetized mice (2.0 g./kg. i.p.) were administered Gallamine in an amount of 100 mg./kg. i.v. and after the respiration had stopped, the time from the last breath until the oscilloscope registering of EKG activity had vanished, determined. Cromipranol was administered 8 minutes before the Gallamine. In a dose of 1.0 mg./kg. i.p. the compound produced a significant prolongation of the life span of from 142 seconds (111:174) in controls to 345 (226:476) seconds in the treated group.

EKG registration following lysinvasopressin

In unanesthesized rabbits, the intravenous administration of 1 E./kg. lysinvasopressin produced changes in the EKG of a coronary ischemic nature similar to that shown in man. Cromipranol in a dose of $10^{-5}$ mol/kg. i.v. administered 5 minutes before the lysinvasopressin inhibited these changes and also showed a definite antiarrhythmic activity.

Alpha-adrenolytic activity

Alpha-adrenolytic agents such as phentolamine, antagonize the contraction of the "Vas deferens" in the rat in vitro following the administration of adrenalin. Cromipranol inhibits the adrenalin contractions of the "Vas deferens" of the rat in an amount of $10^{-6}$ mol and $10^{-5}$ mol/20 ml. It possesses also an alpha-adrenolytic activity which is weaker than that of phentolamine or propranol.

BLOOD PRESSURE

Cromipranol has in anesthetized normotensive rats and cats in a dose of 20 mg./kg. no influence on blood pressure. In unanesthetized normotensive dogs, in a dose of 10 mg./kg. i.v. or 25 mg./kg. i.v. Cromipranol produces a transitory decrease in blood pressure of 20–40% which is dissipated in 10 minutes. In a dose of 300 mg./kg. per os Cromipranol produces a decrease in blood pressure 2 to 5 hours after administration of 20–30% and also a decrease in pulse rate of 25%. The EKG picture remains unchanged.

The results of the tests unequivocally demonstrate the coronary activity of Cromipranol, its favorable influence on experimental myocardial infarct and in lengthening the life of heart muscles following asphyxia. In addition, the compound of the invention demonstrates a weak alpha-adrenolytic effect, which on the one hand is not disturbing and which on the other hand however has no special significance.

We claim:

1. A member selected from the group consisting of chromane derivatives having the following formula

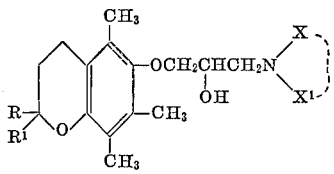

wherein R is a member selected from the group consisting of hydrogen and alkyl having 1 to 16 carbon atoms, R' is a member selected from the group consisting of hydrogen and methyl, X' is a member selected from the group consisting of hydrogen, alkyl having 1 to 8 carbon atoms and carbocyclic aralkyl having up to 8 carbon atoms, X is a member selected from the group consisting of hydrogen, alkyl having 1 to 10 carbon atoms, carbocyclic aryl having up to 10 carbon atoms and carbocyclic aralkyl having up to 10 carbon atoms, wherein X' and X together with —C—C—C—, —C—O—C— or —C—N—C— linkage and the nitrogen atom to which they are attached can form a piperidino, morpholino or piperazino ring; and the pharmaceutically acceptable acid addition salts thereof.

2. A compound according to claim 1 designated 2,2,5,7,8 - pentamethyl - 6 - (3-isopropyl-amino-2-hydroxypropoxy)-chromane.

3. A compound according to claim 2 in the form of its hydrochloride.

4. A compound according to claim 2 in the form of its oxalate.

5. A compound according to claim 2 in the form of its tartrate.

6. A compound according to claim 1 designated 2,2,5,7,8-pentamethyl - 6 - (3-tert.-butylamino-2-hydroxypropoxy)-chromane.

7. A compound according to claim 6 in the form of its oxalate.

References Cited

UNITED STATES PATENTS 3,410,851  11/1968  Stauffer _____ 260—345.2 X
3,436,393  4/1969   De Wald _____ 260—345.2 X

OTHER REFERENCES

Weissberger: The Chemistry of Heterocyclic Compounds, vol. 19, part 1, "Heterocyclic Compounds with Three and Four-Membered Rings," Interscience Publishers, New York (1964), pp. 316–25.

JOHN M. FORD, Primary Examiner

U.S. Cl. X.R.

260—294.7 D, 247.7 A, 268 BC, 326 A, 326.5 D; 424—283